United States Patent [19]
Webb et al.

[11] Patent Number: 5,621,909
[45] Date of Patent: Apr. 15, 1997

[54] SPECIALIZED MILLICODE INSTRUCTION FOR RANGE CHECKING

[75] Inventors: Charles F. Webb, Poughkeepsie; Mark S. Farrell, Pleasant Valley; Wen H. Li, Poughkeepsie, all of N.Y.

[73] Assignee: International Business Machines Corporation, Armonk, N.Y.

[21] Appl. No.: 614,148

[22] Filed: Mar. 12, 1996

[51] Int. Cl.$^6$ .................................................. G06F 9/00
[52] U.S. Cl. .................... 395/564; 395/183.11; 395/670; 395/800
[58] Field of Search ................ 395/375, 183.11, 395/185.2, 650, 800

[56] References Cited

U.S. PATENT DOCUMENTS

| | | |
|---|---|---|
| 3,990,054 | 11/1976 | Perlowski . |
| 4,366,537 | 12/1982 | Heller . |
| 4,589,065 | 5/1986 | Auslander . |
| 4,809,157 | 2/1989 | Eilert . |
| 4,901,233 | 2/1990 | Liptay . |
| 5,003,468 | 3/1991 | Watanabe . |
| 5,136,696 | 8/1992 | Beckwith . |
| 5,226,164 | 7/1993 | Nadas . |
| 5,261,084 | 11/1993 | Hashiguchi . |
| 5,280,593 | 1/1994 | Bullions . |
| 5,307,504 | 4/1994 | Robinson . |
| 5,333,287 | 7/1994 | Buerkle . |
| 5,335,334 | 8/1994 | Takahashi . |
| 5,341,482 | 8/1994 | Cutler . |
| 5,345,567 | 9/1994 | Hayden . |
| 5,440,702 | 8/1995 | Brewer et al. .................. 395/375 |

OTHER PUBLICATIONS

IBM TDB vol. 25, No. 4A, Sep. 1992 "Milli–Code"Bullions et al.

*Primary Examiner*—William M. Treat
*Assistant Examiner*—Saleh Najjar
*Attorney, Agent, or Firm*—Lynn L. Augspurger; Laurence J. Marhoefer

[57] ABSTRACT

A range check instruction sequence, which performs a logical comparison between two 32-bit values and updates the condition code as a result. It operates identically to the ESA/390 instruction compare logical (CLR) except for the way in which the condition code is set. The new condition code is a function of both the comparison result and the previous condition code. If the first operand is greater than the second operand, the condition code remains unchanged. If the first operand is less than or equal to the second operand, the condition code is set to 2 if it was previously 0 or 1, and is set to 3 if it was previously 2 or 3. This may be understood as advancing the state of the condition code among the groups (0,1), 2, and 3 if the first operand is not greater than the second operand.

1 Claim, 2 Drawing Sheets

5,621,909

SPECIALIZED MILLICODE INSTRUCTION FOR RANGE CHECKING

BACKGROUND OF THE INVENTION

Field of the Invention

This invention relates to improvements in pipelined computer processors that execute relatively simple instructions in hardware controlled execution units and execute relatively complex instructions in a milli-mode architected state with vertical microcode (i.e. millicode) routines executing in the same hardware controlled execution units. More particularly, this invention relates to a set of specialized millicode instructions which reduce the number of millicode instructions and machine cycles required to perform certain operations; namely, range checking.

CROSS REFERENCE TO RELATED APPLICATIONS

The present United States patent application is related to the following co-pending United States patent applications which are assigned to the assignee of the present application.

Application Ser. No. 08/414,154, filed Mar. 31, 1995, (attorney Docket No. PO9-94-045), entitled "Specialized Millicode Instruction."

Application Ser. No. 08/414,821, filed Mar. 31, 1995, (attorney Docket No. PO9-94-054), entitled "Millicode ReadOnly Storage With Entry Point Patch Control."

Application Ser. No. 08/414,977, filed Mar. 31, 1995, (attorney Docket No. PO9-94-056), entitled "Hardware Retry Trap for Millicoded Processor"

Application Ser. No. 08/414,158, filed Mar. 31, 1995, (attorney Docket No. PO9-94-060), entitled "Addressing Extended Memory Using Millicode."

Application Ser. No. 08/414,812, filed Mar. 31, 1995, (attorney Docket No. PO9-94-061), entitled "Mapping Processor State Into A Millicode Addressable Processor State Register Array."

Application Ser. No. 08/414,164, filed Mar. 31, 1995, (attorney Docket No. PO9-94-062), entitled "Linking Program Access Register Number With Millicode Operand Access."

Application Ser. No. 08/414,975, filed Mar. 31, 1995, (attorney Docket No. PO9-94-069), entitled "Priority and Recovery Method For System Serialization (Quiesce)."

Application Ser. No. 08/414,961, filed Mar. 31, 1995, (attorney Docket No. PO9-95-009), entitled "Specialized Millicode Instruction for String Operations."

DESCRIPTION OF THE PRIOR ART

Instruction sets used in computer systems employing so-called Complex Instruction Set Computing (CISC) architecture include both simple instructions (e.g. Load, or Add) and complex instructions (e.g. Program Call, or Load Address Space Parameters). As an example to which the invention has particular relevance, see "IBM Enterprise Systems Architecture/390 Principles of Operation" (Publication Number SA22-7201-02, available from IBM Corporation, Armonk, N.Y.), which is incorporated herein by reference in its entirety. As these computer systems (e.g. IBM System 390) have become more powerful, larger percentages of the instruction set have been implemented using hardware execution units to increase the systems performance. Conventionally, the complex functions are implemented in microcode because building hardware execution units to execute them is expensive and error prone.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

More recently, prior art proposals have been advanced for machines with a so-called milli-mode operating capability; see, for example, IBM Technical Disclosure Bulletin Vol. 35, No. 4 A of September 1992, incorporated herein by reference, and U.S. Pat. Nos. 5,280,593 and 5,226,164 assigned to the assignee of this invention and also incorporated herein by reference.

A milli-mode operation enables implementation of complex functions in a large, hardware controlled, pipelined, general purpose digital computer without a microprocessor. Millimode implements these complex functions with the flexibility provided by firmware and avoids a packaging problem introduced by the inclusion of microprocessor hardware. Rather than a microprocessor, milli-mode uses the preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in the instruction decode logic detects the requirement to enter milli-mode, and this causes millicode routines to be fetched. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

The hardware-executed instructions which are valid only for millicode are generally of a format and a function similar to those of ESA/390 instructions. In this way, the unique hardware required to implement these instructions is minimized, and the simplicity of the hardware design is maintained. This simplicity of hardware controls is a chief advantage of millicode over other forms of internal code (e.g. microcode) which require considerably more unique hardware.

A disadvantage of a millicoded design is that some complex operations require more internal code instructions and/or more machine cycles than with some forms of microcode. In some cases, this is due to the inefficiency of the base instruction set (e.g. the hardware-executed ESA/390 instructions) when used to perform these complex operations. Depending on the frequency with which these operations are performed, the impact on overall system performance may be significant.

Specifically, there are a number of cases in which millicode must check to see if a particular value lies within the range specified by two other values. In some cases, an "inverted range" may be specified in which the starting value for the range is greater than the ending value; in these cases, the test value is said to be in the range if it is not between the two range limits. An example of a function requiring such a range check is ESA/390 Program Event Recording (PER). While such a range check can be performed using base ESA/390 instructions (e.g. using the compare logical instruction), this requires several conditional branches which significantly affect the performance of the millicode. Thus it is desirable to define a new hardware function which millicode can use to perform such operations more efficiently.

An object of this invention is the provision of a specialized millicode instruction set which reduces the number of millicode instructions and machine cycles required to perform range checking.

Another object of this invention is the provision of a specialized millicode instruction set which conforms to an instruction format for normal (i.e. non-millicode) operation and which requires a minimum of hardware unique to the specialized set.

Briefly, this invention contemplates the provision of a range check instruction sequence, which performs a logical comparison between two 32-bit values and updates the condition code as a result. It operates identically to the ESA/390 instruction compare logical (CLR) except for the way in which the condition code is set. The new condition code is a function of both the comparison result and the previous condition code. If the first operand is greater than the second operand, the condition code remains unchanged. If the first operand is less than or equal to the second operand, the condition code is set to 2 if it was previously 0 or 1, and is set to 3 if it was previously 2 or 3. This may be understood as advancing the state of the condition code among the groups (0,1), 2, and 3 if the first operand is not greater than the second operand. This instruction is designed to work in conjunction with the ESA/390 instruction compare logical (CLR) in a specific sequence of instructions (which may be implemented in a millicode macro). Because this sequence is crucial to the proper operation of the range check assist, both the instruction and the sequence which uses it are part of this invention.

The range check function is accomplished via a sequence involving an ESA/390 CLR instruction and two of this new "Compare Logical for Range Check" (CLRNG) instruction, as follows. If X and Z denote the starting and ending limits of the range, and Y is the value to be tested, they Y is in the range (X,Z) if:

[($X \leq Z$) and ($X \leq Y$) and ($Y \leq Z$)] or

[($X > Z$) and (($X \leq Y$) or ($Y \leq Z$))]

where the first term covers a "normal" range ($X \leq Z$) and the second term covers an "inverted" range ($X > Z$). To perform a range check, X, Y and Z are first loaded in millicode general registers (MGRs) denoted RX, RY and RZ, and the following sequence is executed:

| CLR   | RX,RZ |
|-------|-------|
| CLRNG | RX,RY |
| CLRNG | RY,RZ |

The CLR instruction sets the condition code to 0 if ($X<Z$), to 1 if ($X=Z$), and to 2 if ($X>Z$). The first CLRNG instruction changes the condition code from 0 or 1 to 2, or from 2 to 3, if ($X \leq Y$), and leaves the condition code unchanged otherwise. The second CLRNG instruction changes the condition code from 0 or 1 to 2, or from 2 to 3, if ($Y \leq Z$), and leaves the condition code unchanged otherwise. Thus if:

[($X \leq Z$) and ($X \leq Y$) and ($Y \leq Z$)]

then the condition code will be 0 or 1 after the CLR; it will be changed to 2 by the first CLRNG instruction and then to 3 by the second CLRNG instruction. Similarly, if:

[($X > Y$) and (($X \leq Y$) or ($Y \leq Z$))]

then the condition code will be 2 after the CLR and will be changed to 3 by one of the two CLRNG instructions, depending on whether ($X \leq Y$) or ($Y \leq Z$) is true. For any other consistent relationships of X, Y and Z, the condition code at the end of the sequence will be 0, 1 or 2. Thus the code may issue these three instructions and then test the condition code once to determine if Y is in the range (X,Z); this is the case if and only if the final condition code is 3.

BRIEF DESCRIPTION OF THE DRAWINGS

The foregoing and other objects, aspects and advantages will be better understood from the following detailed description of a preferred embodiment of the invention with reference to he drawings in which.

DETAILED DESCRIPTION OF A PREFERRED EMBODIMENT OF THE INVENTION

This following exemplary embodiment of the invention is applicable in the overall context of a system generally conforming to IBM 390 system architecture. A more detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below. While the System 390 environment will be used as an example, it should be understood that the present invention is also readily applicable to other IBM (e.g. IBM System 370) and non-IBM architectures as well.

While not limited thereto, the invention is particularly well suited for use in conjunction with the enhanced error recovery system described in copending application attorney docket P09-93-035, Ser. No. 08/149,260, filed Nov. 9, 1993, assigned to the assignee of this application, and also incorporated herein by reference.

Figure 1:
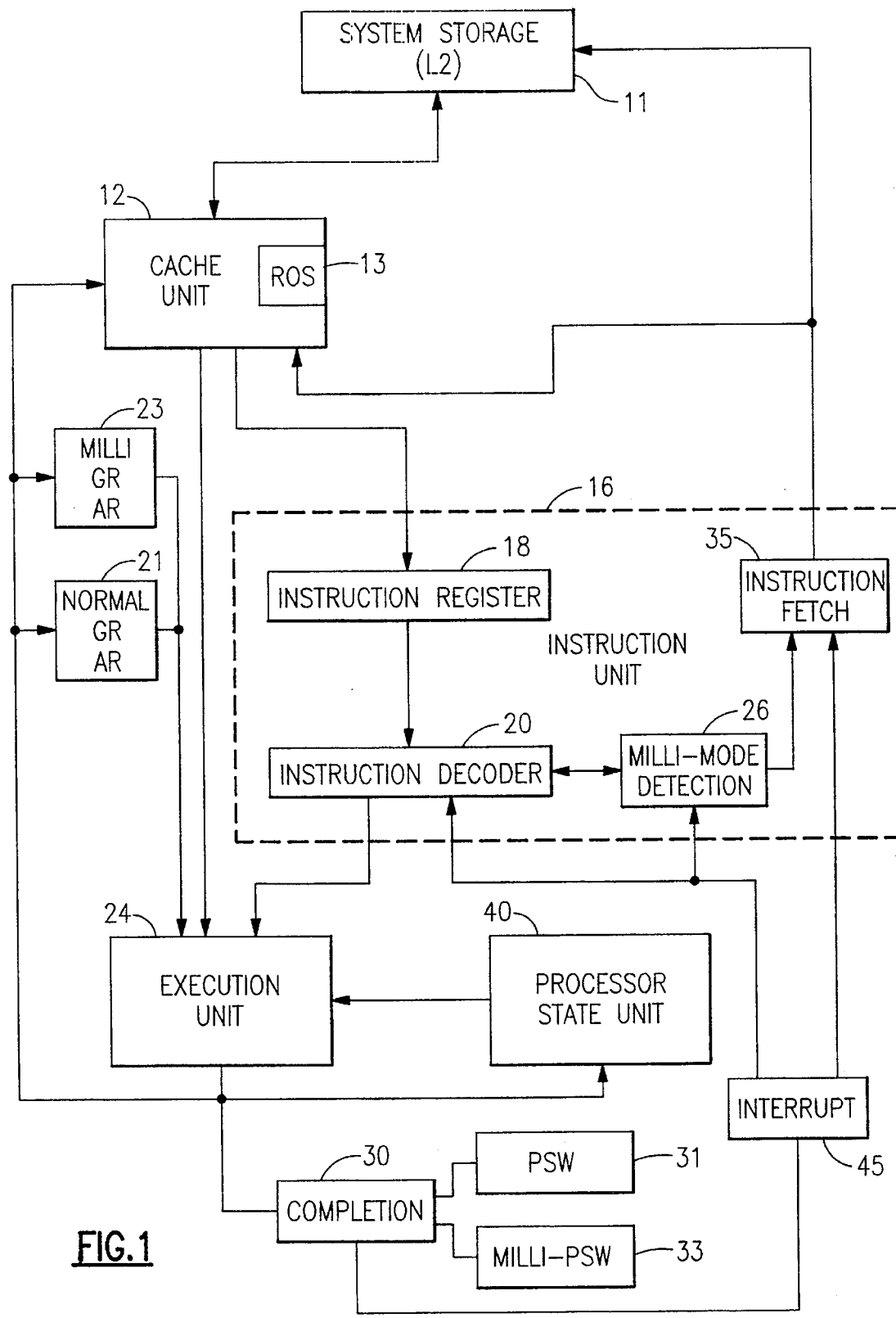
FIG. 1 is a block diagram illustrating the components of a millicode system in accordance with a preferred specific embodiment of the invention.

Referring now to FIG. 1, elements of a system relevant to this invention include a system storage 11, and a cache memory unit 12. The system storage 11 contains the instructions that the processor is executing as well as the data those instructions are manipulating. The cache memory unit 12, which includes a copy of the data and instructions the processor is presently executing, in this preferred embodiment is a cache providing interleaved double word addressing. The cache memory 12 logically includes a contiguously addressable read only store 13, in which code for executing certain frequently invoked milli-mode routines is stored.

An instruction unit subsystem 16 includes an instruction buffer (not shown in FIG. 1), instruction registers 18 and an instruction decoder 20. The instruction unit subsystem receives macro-instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro-code instruction execution and to a set of general purpose registers and access registers 23 for millicode instruction execution. Control logic controls the exchange of data between the two sets of registers when beginning or terminating a millicode routine.

Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 25 and places the decoder 20 into a milli-mode operating state. In this state the decoder is enabled to decode milli-mode instructions. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers.

A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation.

Milli-mode is enabled when the milli-mode detection logic 26 recognizes that the macro-instruction being decoded is to be implemented with millicode. In response to this recognition, the detection logic 26 signals the decoder 20, the instruction fetch controls 35 and register controls in the execution unit 24. In response to the milli-mode recognition signal from the detection logic 26, the decoder 20 suspends macro-mode decoding, the execution unit register control copies the contents of the GPRs 21 to the milliregisters 23 and causes the system to subsequently use the milli-registers 23. The milli-mode detection logic 26 generates a millicode entry point address.

The entry point address (generated by the milli-mode detection logic 26) is used by the control logic 35 to address the cache 12. Milli-instructions from the cache are sent to the instruction registers 18 where the decoder 20 decodes them and schedules them for execution.

When the processor enters milli-mode, it executes and completes the macro-instructions already in the pipeline conceptually prior to the instruction that caused entry into milli-mode. As the processor completes the macroinstructions, it updates the appropriate GPRs. At the same time, the processor decodes and executes the milliinstructions that implement the macro-instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to begin completing macroinstructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a MEND milli-instruction. This causes the decoder to stop decoding in milli-mode. Depending on whether or not there are additional interrupts that require servicing, the decoder hardware will either redo the interrupt process or return to decoding macroinstructions from the cache.

In the execution of the range checking instruction:

| 'B2CB' | //////////// | R1 | R1 | |
|---|---|---|---|---|
| 0 | 16 | 24 | 28 | 31 | millicode registers R1 and R2 are compared, and a condition code is modified based upon the result of the comparison.

Figure 2:
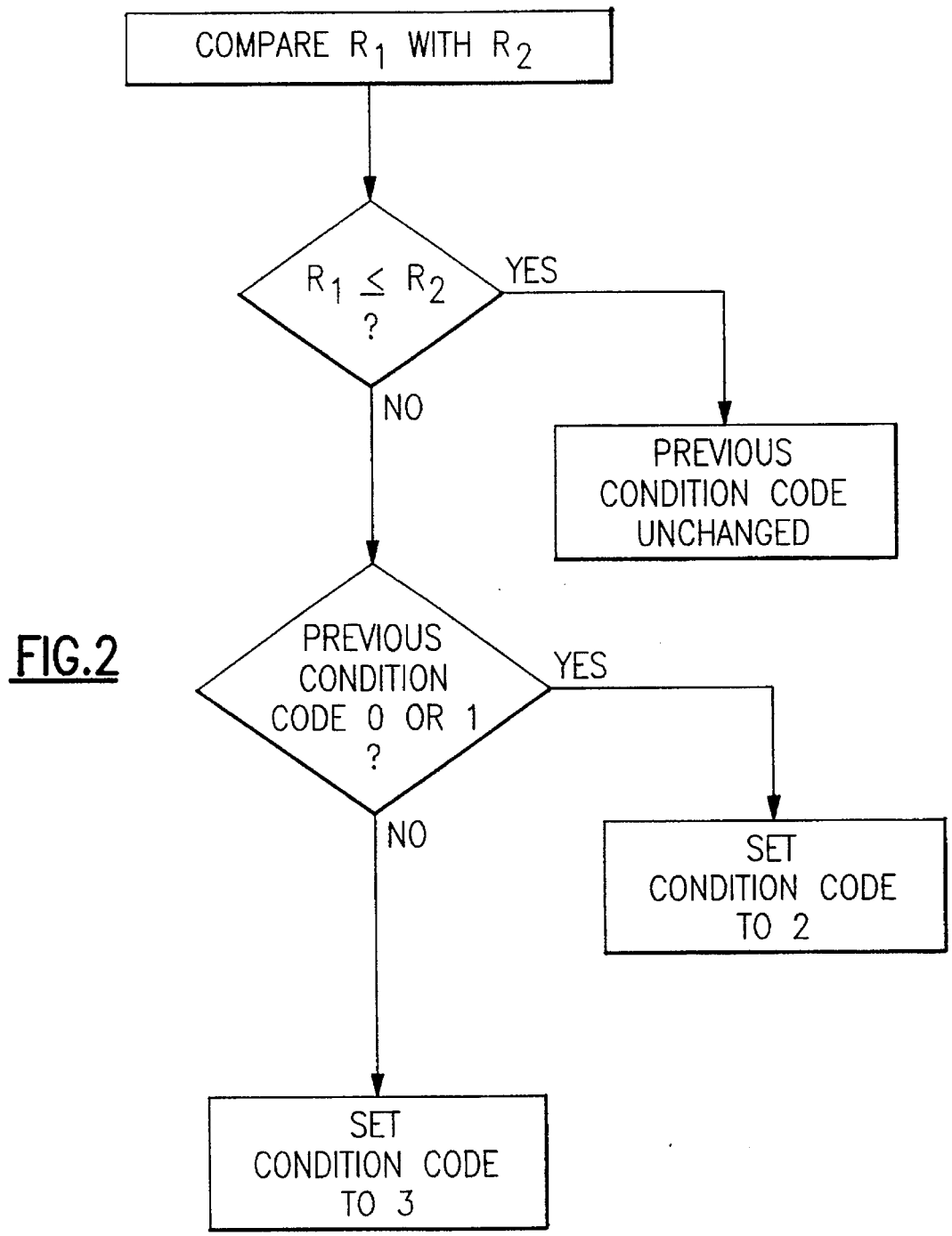
FIG. 2 is a flow diagram of the compare logical for range check operational steps in accordance with the teachings of this invention.

Referring now to FIG. 2, the condition code is a function of both the comparison and the previous condition code, to allow this instruction to be used in a sequence that performs a range check. If the result of the comparison is that MGR R1 is greater than MGR R2, the condition code is not changed. Otherwise (i.e. when MGR R1 is less than or equal to MGR R2) the condition code is set to 2 if the previous condition code was 0 or 1, and to 3 if the previous condition code was 2 or 3. The condition code settings are defined as follows:

| CC | Condition |
|---|---|
| 0 | MGR R1 greater than MGR R2, and previous CC = 0 |
| 1 | MGR R1 greater than MGR R2 and previous CC = 1 |
| 2 | MGR R1 greater than MGR R2, and previous CC = 2; |

| CC | Condition |
|---|---|
|  | or MGR R1 less than or equal to MGR R2 and previous CC = 0 or 1 |
| 3 | Previous CC = 3, or MGR R1 less than or equal to MGR R2 and previous CC = 2 |

This instruction is intended for use as part of a sequence to determine if one value (Y) is in the range (X,Z), where the range may be "inverted" (i.e. X>Z). (An example of this is the PER address range check, where CR10 contains X, CR11 contains Z, and Y is the address being checked). Y is defined to be in the range if:

[(X≦Z) and (X≦Y) and (Y≦Z)] or

[(X>Z) and ((X ≦Y) or (Y≦Z))]

This can be performed using three instructions as follows:

```
CLR      RX,RZ
CLRNG    RX,RY
CLRNG    RY,RZ
``` where RX, RY and RZ designate MGRs containing X, Y and Z, respectively. the condition code at the end of the sequence will be 3 if Y is in the range (X,Z) and 2 otherwise.

Note that a "logical" comparison is performed, and that bit 0 of the MGRs participates in the comparison. If the values being compared are addresses, millicode must insure that bit 0 is masked off in the operands for CLRNG.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a pipelined computer processor, which executes a relatively simple instruction set in a hardware controlled execution unit and executes a relatively complex instruction set in a milli-mode architected state with a millicode sequence of simple instructions in said hardware controlled execution unit, a millicode method for performing range a comparison between two values (R1, R2) stored respectively in two millicode registers, comprising the steps of:

storing a millicode instruction that includes a field specifying one value (R1) of said two values and a field specifying one value (R2) of said two values;

fetching said millicode instruction from storage; and performing a logical comparison between said one (R1) value and said other (R2) value and setting a condition code to one of four condition code values (0,1,2, or 3) as follows:

condition code 0 if R1 is greater than R2 and the previous condition code is set to 0, condition code 1 if R1 is greater than R2 and a previous condition code is set to 1, condition code 2 if R1 is greater than R2 and a previous condition code is set to 2, condition code 2 if R1 is less than or equal R2 and a previous condition code is set to 0 or 1, condition code 3 if R1 is less than or equal to R2 and a previous condition code is set to 2, condition code 3 if a previous condition code is set to 3.

* * * * *